United States Patent [19]

Hari et al.

[11] 4,088,641
[45] May 9, 1978

[54] 4-METHYL-5-(BENZIMIDAZOLONYLAZO)-6-HYDROXYPYRIDONE-2 PIGMENT

[75] Inventors: Stefan Hari, Allschwil; Rolf Müller, Aesch; Rudolf Mory, Dornach, all of Switzerland

[73] Assignee: Ciba-Geigy Corporation, Ardsley, N.Y.

[21] Appl. No.: 658,155

[22] Filed: Feb. 17, 1976

[30] Foreign Application Priority Data

Feb. 21, 1975  Switzerland .................. 2238/75

[51] Int. Cl.$^2$ .................. C09B 29/36; C09D 11/00; D06P 1/44; D06P 1/52
[52] U.S. Cl. .................. 260/156; 106/23; 106/288 Q; 106/308 Q; 260/37 NP; 260/37 P; 260/153; 260/154; 260/155; 260/208
[58] Field of Search ............... 260/152, 154, 155, 156

[56] References Cited

U.S. PATENT DOCUMENTS

| B 348,083 | 1/1975 | Dimroth | 260/154 |
|---|---|---|---|
| 3,642,427 | 2/1972 | Berrie et al. | 8/41 B |
| 3,869,441 | 3/1975 | Hughes | 260/156 |
| 3,941,766 | 3/1976 | Dimroth et al. | 260/155 |
| 3,963,694 | 6/1976 | Mory et al. | 260/154 |

FOREIGN PATENT DOCUMENTS

| 2,364,608 | 6/1974 | Germany | 260/156 |
|---|---|---|---|
| 1,434,654 | 5/1976 | United Kingdom | 260/156 |

*Primary Examiner*—Floyd D. Higel
*Attorney, Agent, or Firm*—Vincent J. Cavalieri

[57] ABSTRACT

Azo pigments of the formula

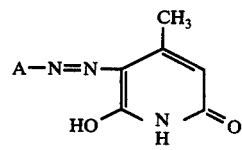

wherein A represents the radical of a heterocyclic diazo component are valuable pigments coloring plastics, melts, spinning solutions, lacquers paints and printing inks in yellow to red shades of great color strength and excellent fastness properties.

1 Claim, No Drawings

4-METHYL-5-(BENZIMIDAZOLONYLAZO)-6-HYDROXYPYRIDONE-2 PIGMENT

The present invention provides useful new azo pigments of formula

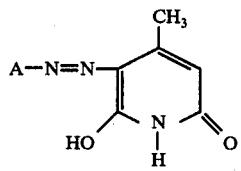
(I)

wherein A represents the radical of a heterocyclic diazo component.

Preferred pigments are those of formula (I), wherein A represents a heterocyclic radical which is attached to the azo group through a benzene ring.

Particularly interesting azo pigments are those of formula (I), wherein A represents a radical of formula

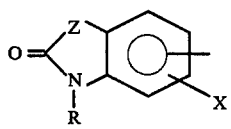

wherein R represents a hydrogen atom, an alkyl group of 1 to 4 carbon atoms or a phenyl radical which is unsubstituted or substituted by halogen atoms, alkyl or alkoxy groups of 1 to 4 carbon atoms, X represents a hydrogen or a halogen atom, an alkyl or alkoxy group of 1 to 4 carbon atoms or a phenoxy group, and Z represents a bridge with one or two members, in particular an oxygen or a sulphur atom or a group of formula

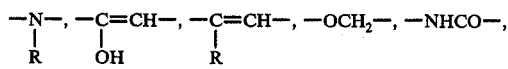

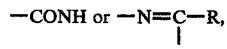

wherein R is as defined hereinbefore.

Particularly preferred azo pigments are those of formula (I), wherein A represents a radical of formula

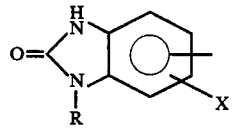

wherein R and X are as defined hereinbefore, and especially those wherein A represents a radical of formula

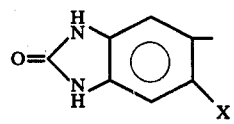

wherein X is as defined hereinbefore.

The pigments of the present invention are obtained by coupling the diazo compound of a heterocyclic amine with the pyridone of formula

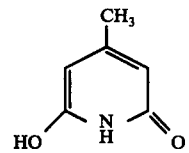

As diazo components there are preferably used those heterocyclic amines whose heterocyclic ring is attached to the amino group through a benzene ring.

Particularly interesting diazo components are amines of formula

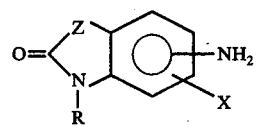

wherein R, X and Z are as defined hereinbefore.

Preferred amines are aminobenzimidazolones of formula

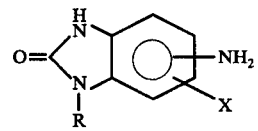

wherein R and X are as defined hereinbefore, and in particular those of formula

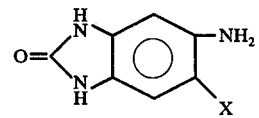

The following amines may be cited as examples:

5-amino-benzimidazolone
5-amino-1-methyl-benzimidazolone
5-amino-1-n-butyl-benzimidazolone
5-amino-1-phenyl-benzimidazolone
5-amino-1-p-chlorophenyl-benzimidazolone
5-amino-1-p-methylphenyl-benzimidazolone
5-amino-1-p-methoxyphenyl-benzimidazolone
5-amino-1-p-acetylaminophenyl-benzimidazolone
5-amino-6-chloro-benzimidazolone
5-amino-6-bromo-benzimidazolone
5-amino-6-methyl-benzimidazolone
5-amino-6-methoxy-benzimidazolone
6-amino-benzoxazolone
6-amino-5-chloro-benzoxazolone
6-amino-5-methyl-benzoxazolone
6-amino-5-chloro-benzthiazolone
6-amino-5-methyl-benzthiazolone
6-amino-quinazolone-(4)
6-amino-2-methyl-quinazolone-(4)
6-amino-2-methoxy-quinazolone-(4)
6-amino-7-chloro-2-methyl-quinazolone-(4)
6-amino-2-phenyl-quinazolone-(4)
6-amino-2(4'-methoxyphenyl)-quinazolone-(4)
6-amino-2(4'-methylphenyl)-quinazolone-(4)
7-amino-quinazolone-(4)
2-(4'-aminophenyl)-quinazolone-(4)

2-(3'-aminophenyl)-quinazolone-(4)
2-(4'-amino-3'-methoxyphenyl)-quinazolone-(4)
2-(4'-amino-3'-chlorophenyl)-quinazolone-(4)
2-(3'-amino-4'-methylphenyl)-quinazolone-(4)
6-amino-2,4-dihydroxyquinazoline
2-(4'-aminophenyl)-4,6-dihydroxy-1,3-diazine
4-(4'-aminophenyl)-2,6-dihydroxy-1,3,5-triazine
7-amino-phenmorpholone-(3)
6-amino-phenmorpholone-(3)
7-amino-6-chloro-phenmorpholone-(3)
7-amino-6-methyl-phenmorpholone-(3)
7-amino-6-methoxy-phenmorpholone-(3)
6amino-quinolone-(2)
6-amino-4-methyl-quinolone-(2)
7-amino-4,6-dimethyl-quinolone-(2)
6-amino-7-chloro-4-methyl-quinolone-(2)
7-amino-4-methyl-6-methoxy-quinolone-(2)
6-amino-1,3-dihydroxy-isoquinoline
6-amino-2,4-dihydroxy-quinoline
6-amino-2,3-dihydroxyquinoxaline, and
5-(4'-amino-2'-methyl-phenylazo)-benzimidazolone
5-(4'-amino-2'-methyl-5'-methoxy-phenylazo)-benzimidazolone
5-(4'-amino-2,5'-dimethoxy-phenylazo)-benzimidazolone
6-amino-7-chloro-2,3-dihydroxyquinoxaline The 2-hydroxy-4-methyl-pyridone-(6) used as coupling component is a known compound.

The coupling takes place advantageously by gradually adding the aqueous solution of the diazonium salt to the solution of the coupling component in a water-miscible organic solvent, for example dimethyl formamide, or by gradually adding the aqueous alkaline solution of the coupling component to the acid solution of the diazonium salt. The coupling is advantageously carried out at a pH of 4 to 6.

It is advantageous to adjust the pH by addition of a buffer. Examples of suitable buffers are the salts, especially alkaline salts, of formic acid, phosphoric acid or, in particular, of acetic acid. The alkaline solution of the coupling component desirably contains a wetting agent, a dispersant or an emulsifier, for example an aralkylsulphonate, such as dodecylbenzenesulphonate or the sodium salt of 1,1'-dinaphthylmethanesulphonic acid, polycondensation products of alkylene oxides, for example the reaction product of ethylene oxide and p-tert. octylphenyl, also alkyl esters of sulphoricinoleates, for example n-butylsulphoricinoleate. The dispersion of the coupling component can also contain with advantage protective colloids, for example methyl cellulose, or small amounts of inert organic solvents which are sparingly soluble or insoluble in water, for example aromatic hydrocarbons which may be halogenated or nitrated, such as benzene, toluene, xylene, chlorobenzene, dichlorobenzene or nitrobenzene, as well as aliphatic halogenated hydrocarbons, for example carbon tetrachloride or trichloroethylene, also water-miscible organic solvents, such as acetone, methyl ethyl ketone, methanol, ethanol or isopropanol, especially dimethyl formamide.

Owing to their insolubility the pigments obtained can be isolated from the reaction mixtures by filtering them off. It is advantageous to subject the pigments to an aftertreatment with an organic solvent, preferably one that boils above 100° C. Particularly suitable organic solvents are: benzenes which are substituted by halogen atoms, alkyl or nitro groups, for example xylene, chlorobenzene, o-dichlorobenzene or nitrobenzene, as well as pyridine bases, such as pyridine, picoline or quinoline, and also ketones, for example, cyclohexanone; ethers, for example ethylene glycol monomethyl and monoethyl ether; amides, such as dimethyl formamide or N-methylpyrrolidone, as well as dimethyl sulphoxide.

The aftertreatment is effected preferably by heating the pigment in the solvent to 100° to 250° C, when in many cases an increase in the granular size occurs. The fastness to light and migration of the resultant pigments are thereby favourably influenced.

It is also possible to carry out the coupling with advantage by continuously combining an acid solution of the diazonium salt with an alkaline solution of the coupling component in a mixing jet so as to effect an immediate coupling of the components. The resultant colourant dispersion is continually drawn off from the mixing jet and the colourant isolated by filtration.

Finally, it is also possible to effect the coupling in such a manner that the amine to be diazotised is suspended with the coupling component in the molar ratio 1:1 in an organic solvent and the coupling mixture is treated with a diazotising agent, in particular an ester of nitrous acid, such as methyl, ethyl, butyl, amyl or octyl nitrite.

The new colourants constitute useful pigments which, in finely divided form, can be used for pigmenting organic material of high molecular weight, for example cellulose ethers and esters, for example ethyl cellulose, nitrocellulose, cellulose acetate, cellulose butyrate, natural resins or artificial resins, such as polymerisation or condensation resins, for example aminoplasts, in particular urea and melamine/formaldehyde resins, alkyd resins, phenolic plastics, polycarbonates, polyolefins, such as polystyrene, polyvinyl chloride, polyethylene, polypropylene, polyacrylonitrile, polyacrylic esters, rubber, casein, silicone and silicone resins, individually or in mixtures.

It is immaterial whether the cited materials of high molecular weight are in the form of plastics, melts or in the form of spinning solutions, lacquers, paints or printing inks. Depending on the use to which they are put, it is advantageous to use the new pigments as toners or in the form of preparations.

The pigments of the present invention are characterised by great colour strength and outstanding fastness to migration. They also have good fastness to light and weather, as well as good dispersibility, transparency, brilliance, and strong resistance to alkali.

In the following Examples which illustrate the invention the parts and percentages are by weight, unless otherwise indicated.

EXAMPLE 1

5.5 parts of 5-amino-6-chloro-benzimidazolone are dissolved at 60° C in 80 parts by volume of glacial acetic acid. The brown solution is stirred with 8.5 parts by volume of concentrated hydrochloric acid and the resultant thick suspension (chlorohydrate) is diluted with 16 parts of water, cooled to 5° C, and treated dropwise in the course of 20 minutes at 5° C with 8.1 parts by volume of 4 normal sodium nitrite solution. The resultant black diazo solution is filtered clear.

Then 4 parts of 94% 4-methyl-6-hydroxypyridone-(2) are dissolved in 9 parts by volume of 30% sodium hydroxide solution in 140 parts of water. The colourless solution is treated dropwise at 5° C in the course of 25 minutes with the diazo solution, in the process of which a red precipitate forms. The resultant suspension is adjusted to pH 5 by slowly adding 60 parts by volume of 30% aqueous sodium hydroxide solution, and is then stirred for 4 hours at a temperature which rises to 20° C, heated to 75° C in the course of 1 hour and filtered hot. The residue is washed free of salt and dried in vacuo at 60° C to yield 9.1 parts (32 91% of theory) of a dark red powder of the formula

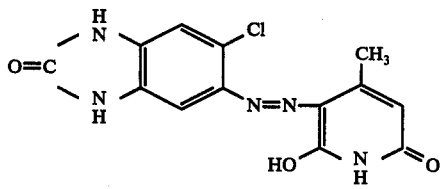

After this pigment has been subjected to an aftertreatment in dimethyl sulphoxide (1 hour at 163° C), it yields fast, red colourations when incorporated into polyvinyl chloride on a roll mill. Polyester resins are also coloured with this pigment in bright and very fast red shades.

Analysis: calculated: C: 48.8; H: 3.15; N: 21.9; Cl: 11.09%; found: C: 48.8; H: 3.2; N: 21.6; Cl: 10.8%.

The 5-amino-6-chloro-benzimidazolone can be prepared as follows:

53.5 parts of 5-nitro-6-chlorobenzimidazolone are suspended in 1000 parts by volume of glacial acetic acid and hydrogenation is effected with hydrogen in the presence of Raney nickel for 18 hours at 25° C to 30° C. Uptake: 15.7 l, theory: 16.8 l. The resultant light blue solution is filtered to remove the Raney nickel, diluted with 2000 parts of water and adjusted to pH 7 by adding 1650 parts by volume of 30% sodium hydroxide solution in the course of 3 hours at 10° to 20° C (external cooling with water). The precipitated product is filtered off with suction, mixed in a mixer with 400 parts of water, collected again by suction filtration, washed with 100 parts of water and dried in vacuo at 60° C. Yield: 42.8 parts (93% of theory) of a beige-coloured powder. The melting point of the product is 288° C with decomposition. A sample recrystallised from nitrobenzene decomposes at 290° C.

Analysis: calculated: C: 45.79; H: 3.30; N: 22.89%; found: C: 46.1; H: 3.3; N: 22.5%.

The following table lists further pigments which are obtained by coupling the diazo compounds of the amines in column I with 4-methyl-6-hydroxypyridone-(2) according to the particulars of Example 1. Column II indicates the shade of polyvinyl chloride coloured with the pigment.

| | I | II |
|---|---|---|
| 2 | 4-methyl-6-amino-7-chloroquinolone-(2) | orange |
| 3 | 4-methyl-6-chloro-7-aminoquinolone-(2) | orange |
| 4 | 5-amino-benzimidazolone | red |
| 5 | 5-amino-6-methyl-benzimidazolone | red |
| 6 | 5-amino-6-methoxy-benzimidazolone | brownish red |
| 7 | 6-methyl-7-amino-phenmorpholone-(3) | orange |
| 8 | 7-amino-phenmorpholone-(3) | red |
| 9 | 6-methoxy-7-amino-phenmorpholone-(3) | red |
| 10 | 6-chloro-7-amino-phenmorpholone-(3) | yellow |
| 11 | 6-amino-quinazolone-(4) | yellow |
| 12 | 7-amino-quinazolone-(4) | yellow |
| 13 | 1-methyl-5-amino-benzimidazolone | red |
| 14 | 1-phenyl-5-amino-benzimidazolone | red |

EXAMPLE 15

The recrystallisation of the crude pigment obtained in Example 1 is carried out in 170 parts by volume of N-methylpyrrolidone (1 hour at 163° C), to yield a reddish orange pigment that colours polyvinyl chloride and polyester resins in bright, orange shades.

Analysis: calculated: C: 48.8; H: 3.15; N: 21.9; Cl: 11.09%; found: C: 48.5; H: 3.2; N: 21.7; Cl: 10.6%.

EXAMPLE 16

2 g of the pigment obtained in Example 1 are ground in a three-roll mill with 36 g of aluminum hydroxid, 60 g of boiled linseed oil of medium viscosity and 2 g of cobalt linoleate. The prints produced with the resultant colour paste are strong and fast to light.

EXAMPLE 17

0.6 g of the pigment obtained in Example 2 is mixed together with 67 g of polyvinyl chloride, 33 g of dioctyl phthalate, 2 g of dibutyl tin laurate and 2 g of titanium dioxide. The mixture is then processed for 15 minutes at 160° C on a roll mill to a thin sheet. The orange colouration produced is strong and fast to migration, heat and light.

What is claimed is:

1. The azo pigment of the formula

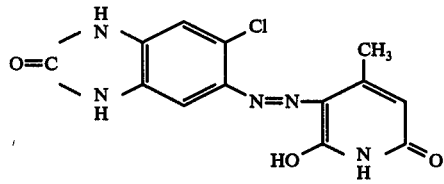

* * * * *